US007897528B2

(12) United States Patent
Finkel et al.

(10) Patent No.: US 7,897,528 B2
(45) Date of Patent: Mar. 1, 2011

(54) HEAT RESISTANT LABELS

(76) Inventors: Mikhail Finkel, Moscow (RU);
Vladimir Victorovich Finkel, Moscow (RU); Gregory W Trebnick, Springboro, OH (US)

(*) Notice: Subject to any disclaimer, the term of this patent is extended or adjusted under 35 U.S.C. 154(b) by 655 days.

(21) Appl. No.: 11/140,855

(22) Filed: May 31, 2005

(65) Prior Publication Data

US 2006/0269721 A1    Nov. 30, 2006

(51) Int. Cl.
B32B 19/06 (2006.01)
(52) U.S. Cl. .............. 442/296; 442/232; 442/301; 428/99; 428/324; 428/339; 428/343; 428/344; 428/354
(58) Field of Classification Search .............. 442/23, 442/28, 31, 233, 296, 378, 412
See application file for complete search history.

(56) References Cited

U.S. PATENT DOCUMENTS

| | | | | |
|---|---|---|---|---|
| 3,811,005 A * | 5/1974 | Trunzo et al. | ......... | 174/121 SR |
| 4,034,153 A * | 7/1977 | Andres et al. | ......... | 174/120 SR |
| 4,340,638 A | 7/1982 | Brugmans | | |
| 4,392,315 A * | 7/1983 | Irving et al. | .................. | 40/27 |
| 4,425,772 A | 1/1984 | Brewer | | |
| 4,694,283 A | 9/1987 | Reeb | | |
| 4,769,276 A * | 9/1988 | Gruss et al. | ................ | 442/296 |
| 4,835,805 A | 6/1989 | Gray | | |
| 4,936,131 A | 6/1990 | Gray | | |
| 5,079,077 A * | 1/1992 | Sakayanagi et al. | ......... | 442/212 |
| 5,309,792 A | 5/1994 | Gerhardt et al. | | |
| 5,328,738 A | 7/1994 | McKilip et al. | | |
| 5,362,554 A * | 11/1994 | Holzer et al. | ................ | 442/73 |
| 5,373,758 A | 12/1994 | Gerhardt | | |
| 5,398,580 A | 3/1995 | Gerhardt et al. | | |
| 5,484,099 A | 1/1996 | Robertson et al. | | |
| 5,484,167 A | 1/1996 | Donaldson et al. | | |
| 5,506,016 A | 4/1996 | Onodera et al. | | |
| 5,508,684 A | 4/1996 | Becker | | |
| 5,521,034 A | 5/1996 | Hotta | | |
| 5,595,817 A * | 1/1997 | Sch afer et al. | ............. | 442/379 |
| 5,714,234 A * | 2/1998 | Robertson | ................ | 428/195.1 |
| 6,153,279 A * | 11/2000 | Charley | .................... | 428/40.1 |
| 6,293,204 B1 | 9/2001 | Regen | | |
| 6,346,884 B1 | 2/2002 | Uozumi et al. | | |
| 6,383,616 B1 | 5/2002 | Uchibori | | |
| 6,390,847 B2 | 5/2002 | Katwala | | |
| 6,517,664 B1 | 2/2003 | Dronzek, Jr. | | |
| 6,526,793 B1 | 3/2003 | Danko et al. | | |
| 6,553,700 B1 | 4/2003 | Hirayama et al. | | |
| 6,574,870 B1 | 6/2003 | Huang | | |
| 6,663,746 B2 | 12/2003 | Dronzek | | |
| 6,726,252 B1 | 4/2004 | Chaikel et al. | | |
| 6,744,367 B1 | 6/2004 | Forster | | |
| 6,764,016 B2 | 7/2004 | Robertson et al. | | |
| 2007/0027241 A1 * | 2/2007 | Akamatsu | ................... | 524/262 |

FOREIGN PATENT DOCUMENTS

WO    WO 2005/021673 A1 *  3/2005

OTHER PUBLICATIONS

Website printout from BGF Industries, Inc. dated Apr. 15, 2005 at http://www.bgf.com/techRefGlassFabric.asp (1 page).
Website printout from JPS Glass dated Apr. 15, 2005 at http://www.jpsglass.com/properties.htm (2 pages).
Website printout from Techlib.com dated Apr. 15, 2005 at http://www.techlib.com/reference/insulation.html (4 pages).
Website printout from Alibaba.com dated Apr. 15, 2005 at http://sh-haiying.en.alibaba.com/product/50038575/50174791/ . . . (2 pages).
Website printout from Alibaba.com dated Apr. 15, 2005 at http://chainsuppliers.alibaba.com/products/china . . . (3 pages).
Website printout from Alibaba.com dated Apr. 15, 2005 at http://sh-haiying.en.alibaba.com/product/50038575/50174790/ . . . (2 pages).
Website printout from ISI Specifications dated Apr. 15, 2005 at http://www.cetaindia.com/table17.html (6 pages).

* cited by examiner

Primary Examiner—Callie E Shosho
Assistant Examiner—Anish Desai
(74) Attorney, Agent, or Firm—David G. Oberdick

(57) ABSTRACT

Various embodiments of the present inventions encompass a variety of methods and devices for attaching labels, tags, or identification devices to hot metals.

9 Claims, 5 Drawing Sheets

HEAT RESISTANT LABELS

BACKGROUND OF THE INVENTION

The present invention relates generally to the identification and labeling of hot metals, such as, hot steel. Metals are heated during the manufacture of many items from raw materials to finished products. Often it is necessary to label a piece of metal for future identification. In particular, the steel industry often needs to label pieces of metal as early in the production process as possible. Such labeling is difficult at high temperatures because the metals are soft and the labels are difficult to attach. Thus, a need exists to provide a reliable means to label or tag pieces of hot metal for future identification.

Presently, no label on tag exists that can be attached to hot metals and successfully remain attached at temperatures exceeding 450° C. Thus, a need exists for a device and method of labeling and/or tagging hot metals at high temperatures. The present invention satisfies this need and also works at lower temperatures.

BRIEF SUMMARY OF THE INVENTION

One embodiment of the present invention comprises a high temperature resistant material having at least one layer of glass fabric material, at least one layer of mica paper, and a polymeric adhesive, which secures the glass fabric material to the mica paper.

Another embodiment of the present invention comprises a high temperature resistant label for use in identifying hot metals comprising a high temperature resistant material. The high temperature resistant material is made of at least one layer of glass fabric material, at least one layer of mica paper, and a polymeric adhesive. The adhesive secures the glass fabric material to the mica paper. The high temperature resistant material is formed to a desired size and shape. In addition to the high temperature resistant material, the high temperature resistant label also comprises an identification means, which is applied to one side of the high temperature resistant material and a thin metal layer, which is formed to the same size and shape as the high temperature resistant material. The thin metal layer is attached to the other side of the high temperature resistant material opposite the identification means.

Another embodiment of the present invention encompasses a high temperature resistant label for use in identifying hot metals comprising a high temperature resistant material. The high temperature resistant material comprises at least one layer of glass fabric material, at least one layer of mica paper and a polymeric adhesive. The adhesive secures the glass fabric material to the mica paper. The high temperature resistant material is formed to a desired size and shape. The label also comprises an identification means, which is applied to one side of the high temperature resistant material.

The present invention also encompasses an embodiment of a high temperature resistant tag for use in identifying hot metals. The tag comprises a high temperature resistant material, which comprises at least one layer of glass fabric material, at least one layer of mica paper and a polymeric adhesive. The adhesive secures the glass fabric material to the mica paper. The high temperature resistant material is formed to a desired size and shape. The tag also comprises an identification means applied to one side of the high temperature resistant material and a thin metal layer formed to the same size and shape as the high temperature resistant material. The thin metal layer is attached to the other side of the high temperature resistant material opposite the identification means.

Another embodiment of the present invention encompasses a high temperature resistant insulating material comprising at least two insulating layers formed under pressure into the high temperature resistant insulating material. Each insulating layer comprises at least one layer of glass fabric material, at least one layer of mica paper and a polymeric adhesive. The adhesive secures the glass fabric material to the mica paper.

Another embodiment of the present invention is a method of labeling hot metals. This method comprises: (i) forming a high temperature resistant material to a desired size and shape; (ii) applying an identification means to one side of the high temperature resistant material; (iii) forming a thin metal layer to the same size and shape as the high temperature resistant material; and (iv) attaching the thin metal layer to the other side of the high temperature resistant material opposite the identification means.

Another embodiment of the present invention encompasses a method of labeling hot metals comprising: (i) forming a high temperature resistant material to a desired size and shape; and (ii) applying an identification means to one side of the high temperature resistant material.

Another embodiment of the present invention encompasses a method of tagging hot metals, which comprises: (i) forming a high temperature resistant material to a desired size and shape; (ii) applying an identification means to one side of the high temperature resistant material; (iii) forming a thin metal layer to the same size and shape as the high temperature resistant material; and (iv) attaching the thin metal layer to the other side of the high temperature resistant material opposite the identification means.

Another embodiment of the present invention encompasses a method for insulating. The method for insulating comprises lining a high temperature environment with a high temperature resistant material. The high temperature resistant material comprises at least two insulating layers formed under pressure into the high temperature resistant insulating material. Each insulating layers comprises at least one layer of glass fabric material, at least one layer of mica paper and a polymeric adhesive. The adhesive secures the glass fabric material to the mica paper.

Another embodiment of the present invention includes a high temperature resistant tag for use in identifying hot metals. The preferred embodiment of this tag comprising: (i) a high temperature resistant material made of at least one layer of glass fabric material, at least one layer of mica paper, and a polymeric adhesive, which secures the glass fabric material to the mica paper, wherein the high temperature resistant material is formed to a desired size and shape; and (ii) an identification means applied to one side of the high temperature resistant material.

Another embodiment of the present invention includes a method of tagging hot metals. The preferred embodiment of this method comprises: (i) forming a high temperature resistant material to a desired size and shape; and (ii) applying an identification means to one side of the high temperature resistant material.

BRIEF DESCRIPTION OF THE DRAWINGS

For the present invention to be easily understood and readily practiced, the invention will now be described, for the purposes of illustration and not limitation, in conjunction with the following figures, wherein.

DESCRIPTION OF THE INVENTION

Certain embodiments of the present invention comprise methods and devices for attaching labels, tags or identification devices (collectively referred to herein as "labels") to the surfaces of hot metals. As an illustration, but not a limitation, it is often difficult to label metals that are above 250° C. and, given the current state of technology, virtually impossible to label metals above 450° C. The present invention provides for a label and a method of labeling that works at higher temperatures, but could also be used at lower temperatures.

Figure 1:
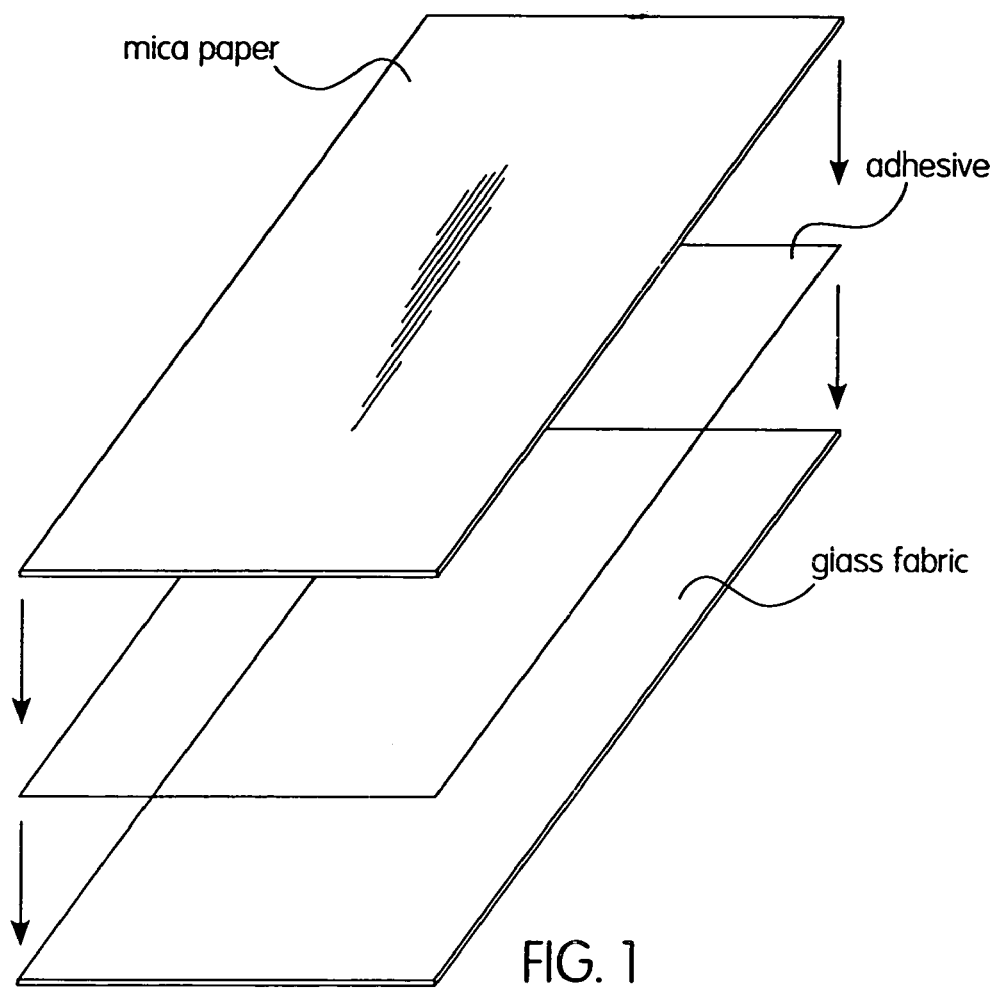
FIG. 1 illustrates one embodiment of the present invention high temperature resistant material.
Figure 2:
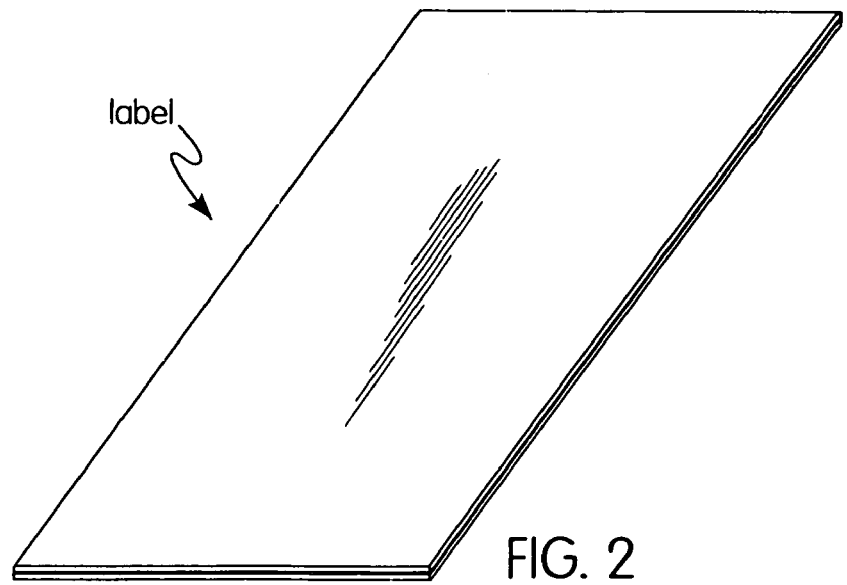
FIG. 2 illustrates one embodiment of a label according to the present invention.
Figure 3:
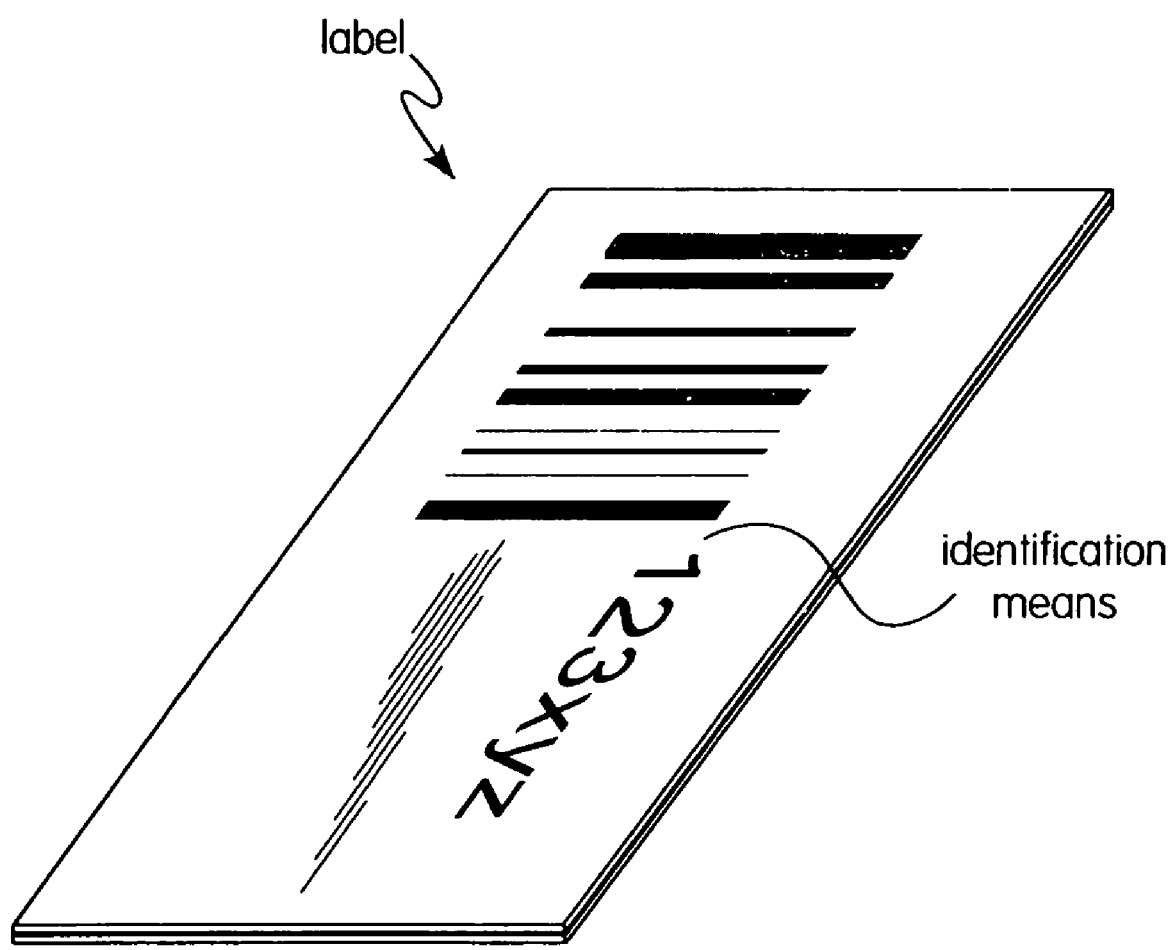
FIG. 3 illustrates another embodiment of a label according to the present invention.
Figure 4:
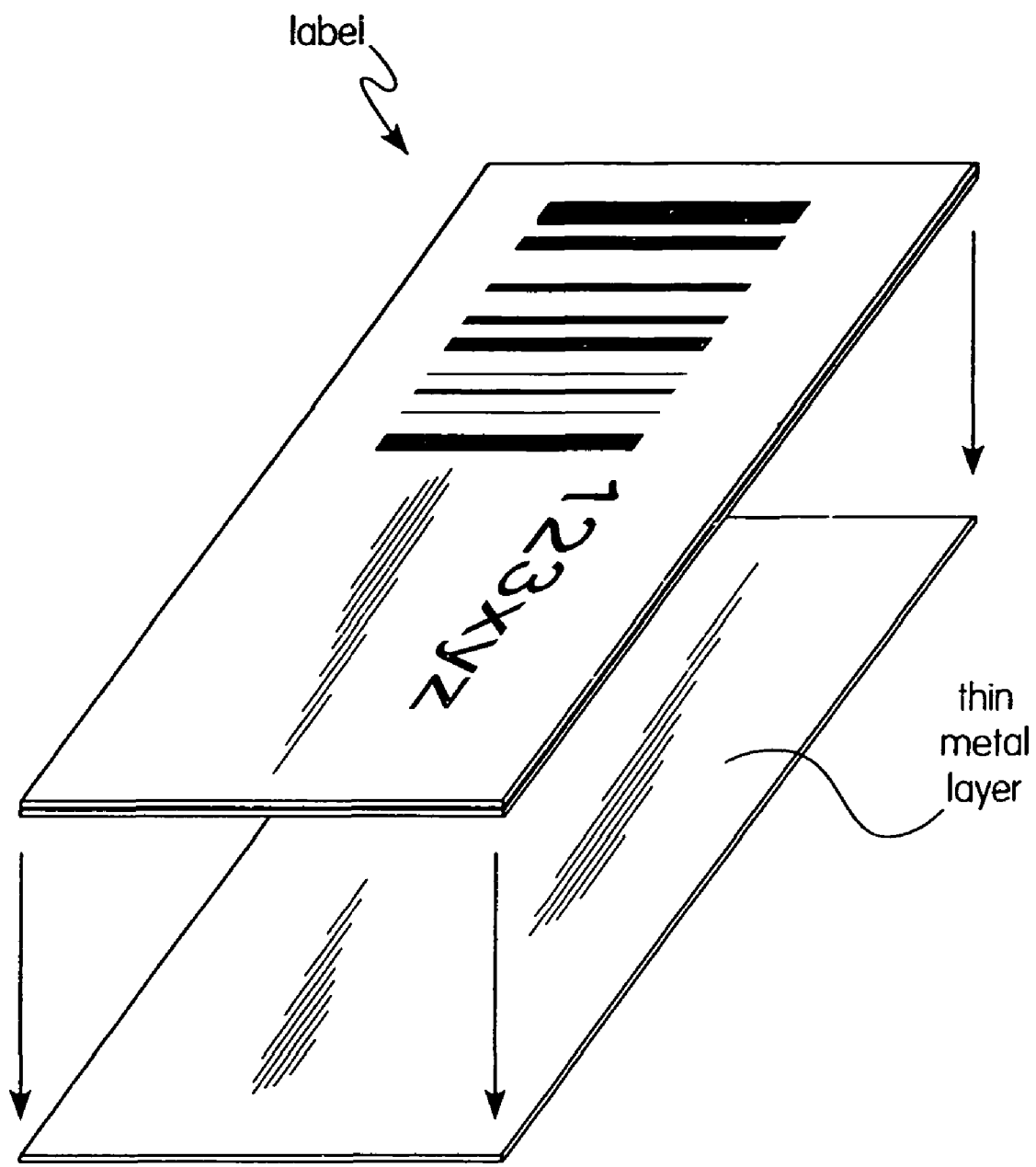
FIG. 4 illustrates one embodiment of a label according to the present invention having a thin metal layer.
Figure 5:
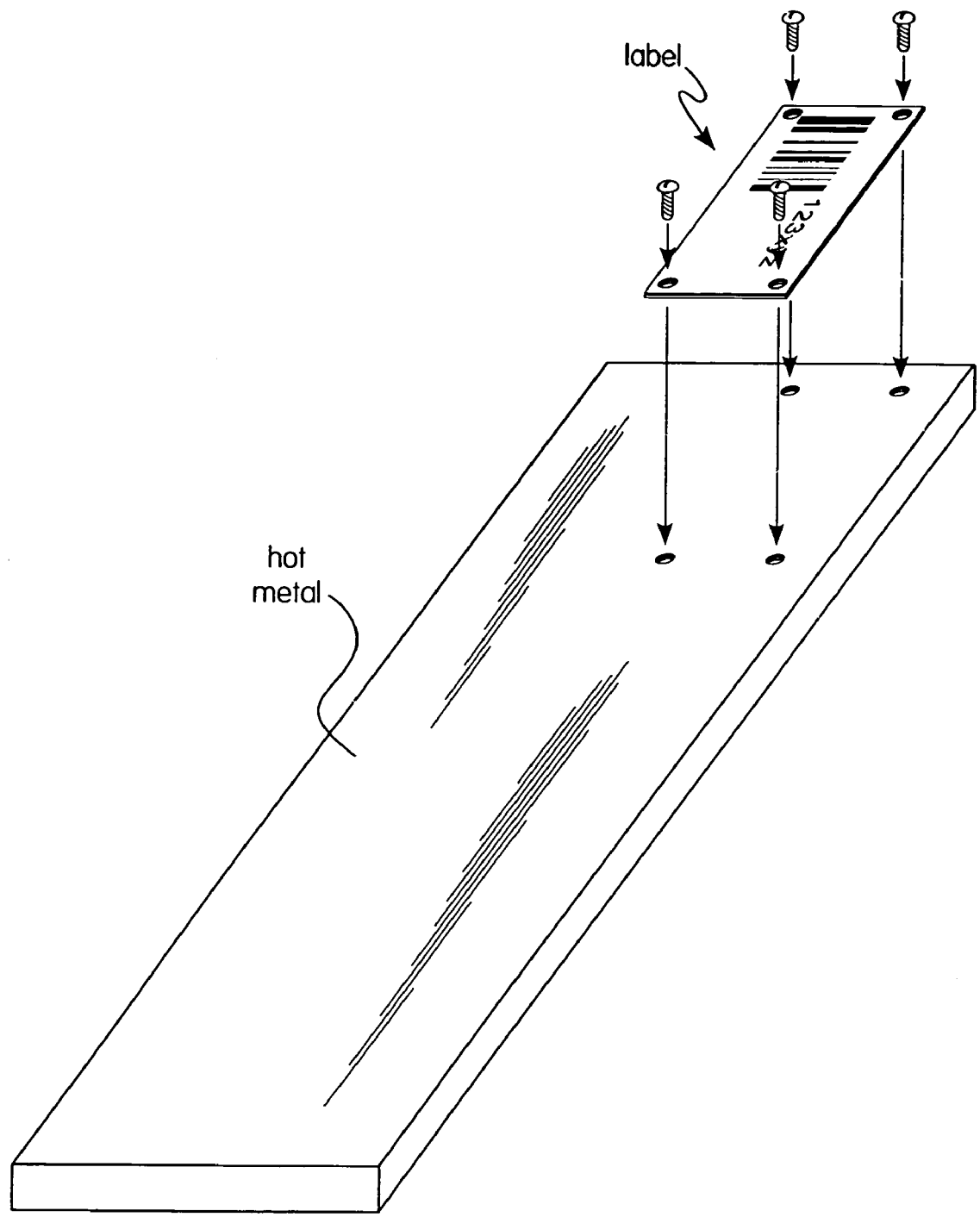
FIG. 5 illustrates one embodiment of a label being attached to hot metal.
Figure 6:
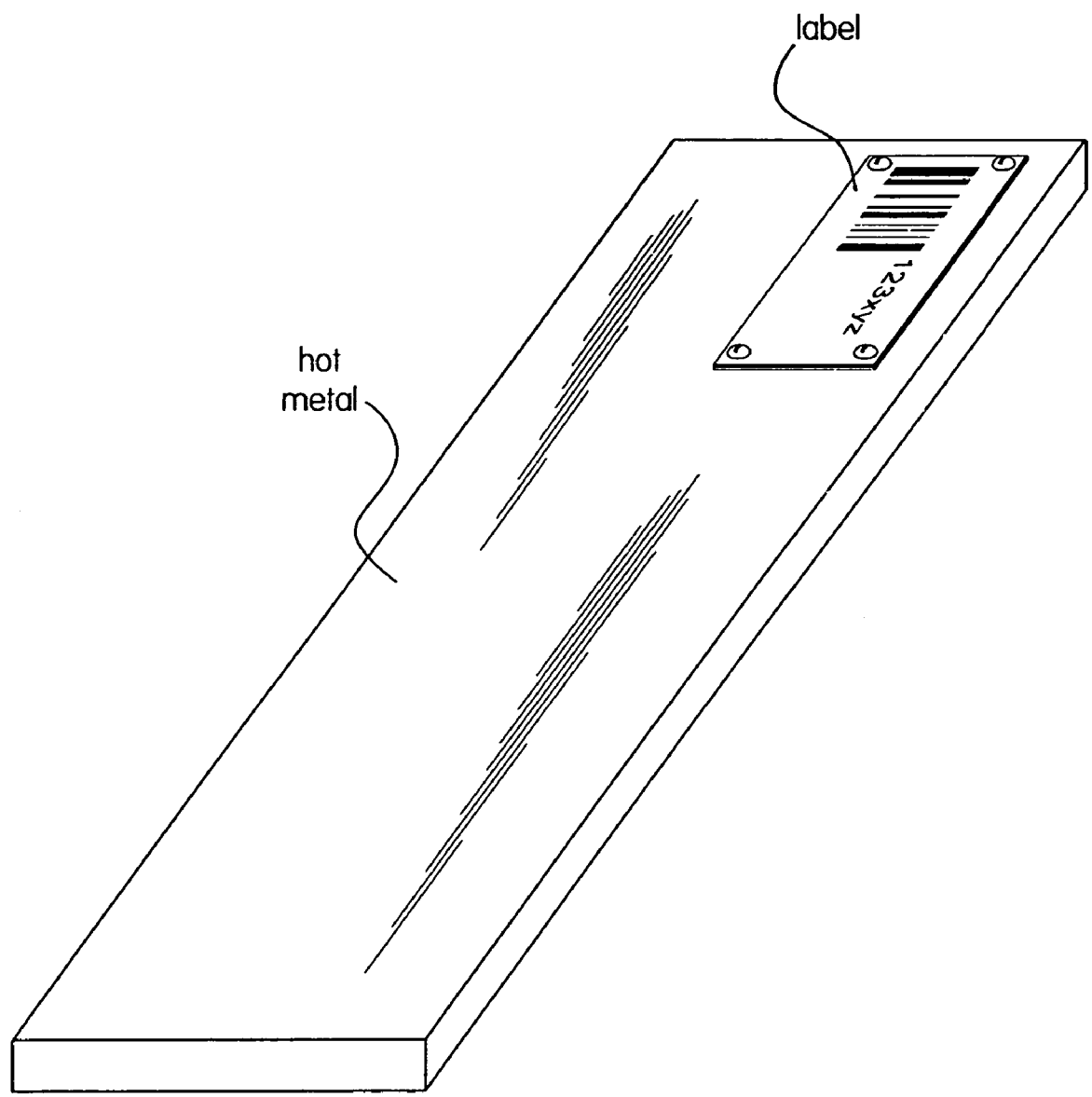
FIG. 6 illustrates one embodiment of a label attached to hot metal.

One embodiment of the present invention encompasses a high temperature resistant material (referred to herein as a "HTRM"). As shown in FIG. 1, the preferred embodiment of the HTRM comprises at least one layer of glass fabric material, which is bonded to at least one layer of mica paper using a polymeric adhesive. The glass fabric may be glass cloth or any glass fabric or cloth-like material presently existing or created in the future or other material with similar properties. Similarly, the mica paper may be any mica paper-type material presently existing or created in the future or other material with similar properties. In the preferred embodiment of the present invention, the polymeric adhesive is a silicone polymer, but it will be obvious to those skilled in the art that other adhesives and means of adhering may be used successfully.

The HTRM may be any thickness that serves the purpose for which it will be used. In the preferred embodiment of the present invention, the HTRM has a thickness of about 70 microns to about 200 microns. Similarly, it will be obvious to one skilled in the art that the glass fabric and the mica paper may be of any thicknesses that serve the purpose for which the HTRM will be used. In the preferred embodiment of the present invention though, the glass fabric material has a thickness of about 30 microns to about 100 microns and the mica paper has a thickness of about 40 microns to about 80 microns.

Again it will be apparent to one skilled in the art that the polymeric adhesive may be applied using any of a variety of methods. In one embodiment of the present invention, the polymeric adhesive is applied under pressure to secure the glass fabric material to the mica paper. The exact pressure will need to be determined based upon a variety of factors, including but not limited to, the type and thickness of the glass fabric, the type and thickness of the mica paper, and the type and thickness of the layer of polymeric adhesive.

Other embodiments of the present invention, as shown in FIGS. 2 through 6, encompass high temperature resistant labels for use in identifying hot metals. In the preferred embodiment of the present invention, these labels may be made of the above-described HTRM. More specifically, in the preferred embodiment of the present invention, the label will be made, in part, of a HTRM comprising: (i) at least one layer of a glass fabric material; (ii) at least one layer of a mica paper; and (iii) a polymeric adhesive, which secures the glass fabric material to the mica paper. In the preferred embodiment of the present invention, the HTRM is formed to a desired size and shape. An identification means may be applied to one side of the HTRM. In one embodiment of the present invention, a thin metal layer is formed to the same size and shape as the HTRM. The thin metal layer is attached to the other side of the HTRM, opposite the side bearing the identification means.

The HTRM in the above-described label and the below-described tags, labels, and methods may have any of the characteristics described above for the HTRM of the present invention.

The above-described embodiment of a label according to the present invention includes an identification means. The identification means may be anything used to identify metal including, but not limited to, one or more, or a combination of, the following: a bar code, a symbol, words, numbers, an alphanumeric combination, or an imprint.

The thin metal layer may be made of any metal or a combination of metals that suit the purpose to which the label will be put. As an example, but not a limitation, the thin metal layer may be a metal foil, aluminum, steel, copper, a metal alloy or magnets. The thin metal layer may be a metal, such as steel, covered in zinc and/or copper, or any other appropriate combination of metals. In the preferred embodiment of the present invention, the thin metal layer is steel.

In various embodiments of the present invention label, the HTRM may be attached to the thin metal layer by a variety of securing means that will be obvious to those in the art. In the preferred embodiment of the present invention, the securing means may be one or more mechanical fasteners, adhesive, epoxy, resin, welding, soldering, liquid metal or magnets. These identified securing means are meant to be illustrative and not limiting as to the possible means for securing the HTRM to the thin metal layer. Similarly, by way of example, the mechanical fasteners may be any of a variety of fasteners known to those in the art, including but not limited to screws, nails, pins and nut and bolt assemblies.

In various embodiments of the present invention, the high temperature resistant label may be attached to the hot metal by any attachment means that securely attaches the label to the hot metal and successfully withstands high temperatures to remain attached.

In one preferred embodiment of the means for attaching the label to the hot metal comprises directly applying the thin metal layer to the hot metal. The thin metal layer will then melt onto the hot metal and attach the label to the hot metal.

In alternative embodiments of the present invention, hot rolls of metal are processed and their temperatures are about 900-1000° C. At such high temperatures, the attachment means may be metal fasteners. The metal fasteners that act to secure the HTRM to the thin metal layer may be designed to protrude through the thin metal layer to contact and bond with the hot metal, particularly as the hot metal cools. These means for attachment can be composed of a material that will easily enter the hot metal and blend into the hot metal. In one embodiment of the present invention, the means for attachment may be of the same material as the hot metal, such that the means of attaching to hot steel are made of steel.

In other embodiments of the present invention, the attachment means may be any of the following: metal fasteners, adhesive, welding, soldering, melting, liquid metal, epoxy, metal foil, lamination, resin or magnets. The mechanical fasteners may be screws, nails, pins or nut and bolt assemblies. It will be obvious to those skilled in the art that many other attachment means are possible.

In one embodiment of the present invention, the magnets are attached to the HTRM with the barcode on it. In this embodiment, a thin layer of metal on the rear of HTRM is not necessary but, nonetheless, it can be there as well. Thus, the HTRM has magnets attached to it. The magnets can be of any size. The magnets can be either on the rear side of the label or they can be both from the rear and from the front side of the label. The magnetic power of the magnets will keep the label firmly between them, i.e. the label will be in the magnetic field of these magnets. The number of magnets can vary. The magnets can be attached either to HTRM itself or to the thin metal layer on the back of the HTRM. The magnets maintain their magnetic power below 600° C. and above that temperature. In this embodiment of the present invention, the label (made from HTRM and the magnets attached to it) is attached to the hot coils of metal (preferably steel) by the magnetic power of the magnets. The magnets may be used instead of an adhesive.

Another embodiment of the present invention encompasses a high temperature resistant label for use in identifying hot metals as described above, but without the thin metal layer. Such a label possesses many of the desirable attributes of the above-identified label but may be more flexible, less costly to manufacture, and may have other advantages. The label without the thin metal layer may have all of the above-outlined variations as for the label with the thin metal layer and the HTRM, except for being able to melt the thin metal layer to the hot metal as a means of attachment. Although, one embodiment of the present invention label without the thin metal layer, may also encompass the use of metal or melted metal to secure the label to hot metal.

The embodiments of the label that lack the thin metal layer may be attached to the hot metal using the same attachment means as identified for the label having the thin metal layer, including using metal fasteners that protrude through the label and act to secure the label to the hot metal by contacting and binding with the hot metal as said hot metal cools.

The present invention also encompasses various embodiments of a high temperature resistant tag for use in identifying hot metals. These embodiments of the tag may be constructed according to all of the above-identified variations for the labels and the HTRM. The primary difference would be that the tag would be attached to the hot metal at a distance as opposed to being applied directly to the surface of the hot metal. The preferred embodiment of the tag, therefore, also comprises a hanger for hanging the tag from the hot metal.

The present invention also comprises a high temperature resistant insulating material comprised of two or more layers of the high temperature resistant material of the present invention layered together. Thus, the insulating material of the present invention consists of at least two layers of the high temperature resistant material of the present invention comprising: (i) at least one layer of glass fabric material; (ii) at least one layer of mica paper; and (iii) a polymeric adhesive, which secures the glass fabric material to the mica paper. All of the above-identified variations and qualities of the HTRM may also be used to further define the various embodiments of the insulating material of the present invention.

The present invention also encompasses various methods similar to the above-identified devices and compositions. One such method encompasses a method of labeling hot metals. Another method encompasses the tagging of hot metals according to all of the above-identified variations. These methods comprise the steps of: (i) forming a high temperature resistant material to a desired size and shape; (ii) applying an identification means to one side of the high temperature resistant material; (iii) forming a thin metal layer to the same size and shape as the high temperature resistant material; and (iv) attaching the thin metal layer to the other side of the high temperature resistant material opposite the identification means. These methods also can be modified to work without the thin metal layer.

These methods include all of the characteristics and attributes of the above-outline high temperature resistant material, the high temperature resistant tags, and the high temperature resistant labels. By way of example, the high temperature resistant material of these methods comprises: (i) at least one layer of glass fabric material; (ii) at least one layer of mica paper; and (iii) a polymeric adhesive, which adhesive secures the glass fabric material to the mica paper.

Other embodiments of the present invention also encompass methods of labeling hot metals according the above-described methods and apparatuses, but without the use of a thin metal layer.

Another embodiment of the present invention encompasses a method for insulating. This method comprises lining a high temperature environment with a high temperature resistant material. The high temperature resistant material comprises at least two insulating layers formed under pressure into the high temperature resistant insulating material, wherein one of the insulating layers comprises at least one layer of glass fabric material; at least one layer of mica paper; and a polymeric adhesive that secures the glass fabric material to the mica paper. The HTRM of this method encompasses all of the above-identified qualities and variations of the HTRM.

In one preferred embodiment of this invention, any and all of the above-identified methods and devices will be used to attach a HTRM of the present invention to the hot surface of steel or aluminum. In another preferred embodiment of this invention, any and all of the above-identified methods and devices may use an adhesive that comprises aluminum.

The above-provided discussion of various embodiments of the present invention is intended to be an illustrative, but not exhaustive, list of possible embodiments. It will be obvious to one skilled in the art that other embodiments are possible and are included within the scope of this invention.

What is claimed is:

1. A high temperature resistant label for use in identifying hot metal comprising:
   a high temperature resistant material comprising:
      at least one layer of glass fabric material;
      at least one layer of mica paper; and
      a polymeric adhesive, said adhesive securing said glass fabric material to said mica paper, wherein said high temperature resistant material is formed to a desired size and shape;
   an identification means applied to one side of said high temperature resistant material;
   a thin metal layer formed to the same size and shape as said high temperature resistant material, said thin metal layer is attached to the other side of said high temperature resistant material opposite said identification means; and
   an attachment means wherein the attachment means is metal fasteners;
   wherein the high temperature label remains attached to the surface of metals having a temperature between 900-1000° C., and wherein said high temperature resistant material is attached to said thin metal layer by an attachment means, wherein said attachment means is provided by said metal fasteners, which act to secure said high temperature resistant material to said thin metal layer and protrude through said thin metal layer to contact and bond with said hot metal as said hot metal cools.

2. The high temperature resistant label of claim 1, wherein said glass fabric material comprises glass cloth.

3. The high temperature resistant label of claim 1, wherein said polymeric adhesive comprises a silicone polymer.

4. The high temperature resistant label of claim 3, wherein said glass fabric material has a thickness of about 30 microns to about 100 microns and said mica paper has a thickness of about 40 microns to about 80 microns.

5. The high temperature resistant label of claim 1, wherein said high temperature resistant material has a thickness of about 70 microns to about 200 microns.

6. The high temperature resistant label of claim 1, wherein said polymeric adhesive is applied under pressure to secure said glass fabric material to said mica paper.

7. The high temperature resistant label of claim 1, wherein said identification means is selected from the group consisting of a bar code, a symbol, words, numbers, an alphanumeric combination, and an imprint.

8. The high temperature resistant label of claim 1, wherein said thin metal layer is selected from the group consisting of metal foil, aluminum, steel, copper, a metal alloy and magnets.

9. The high temperature resistant label of claim 1, wherein said metal fasteners are selected from the group consisting of screws, nails, pins and nut and bolt assemblies.

\* \* \* \* \*